(12) United States Patent
Moreau et al.

(10) Patent No.: US 10,408,595 B2
(45) Date of Patent: Sep. 10, 2019

(54) MEASUREMENT GUIDE AND METHOD FOR SELECTING SHRINK TUBING FOR INSTALLATION ON HAND TOOLS

(71) Applicant: Ty-Flot, Inc., Manchester, NH (US)

(72) Inventors: Darrell A. Moreau, Portsmouth, NH (US); Andre W. Moreau, Deerfield, NH (US); Mathew A. Moreau, Deefield, NH (US)

(73) Assignee: Ty-Flot, Inc., Manchester, NH (US)

(*) Notice: Subject to any disclaimer, the term of this patent is extended or adjusted under 35 U.S.C. 154(b) by 349 days.

(21) Appl. No.: 14/976,418

(22) Filed: Dec. 21, 2015

(65) Prior Publication Data

US 2017/0176159 A1    Jun. 22, 2017

(51) Int. Cl.
| | | |
|---|---|---|
| *G07G 1/00* | (2006.01) | |
| *G01B 3/10* | (2006.01) | |
| *F16B 4/00* | (2006.01) | |
| *A45F 5/02* | (2006.01) | |
| *A45F 5/00* | (2006.01) | |

(52) U.S. Cl.
CPC ............ *G01B 3/1082* (2013.01); *A45F 5/021* (2013.01); *F16B 4/008* (2013.01); *A45F 2005/006* (2013.01)

(58) Field of Classification Search
CPC .. G01B 3/1082; A45F 5/021; A45F 2005/006; F16B 4/008
USPC ...................................... 235/7 A, 71 R, 71 A
See application file for complete search history.

(56) References Cited

U.S. PATENT DOCUMENTS

| 650,389 | A | * | 5/1900 | Hatfield | .......................... 33/179 |
| 4,441,258 | A | * | 4/1984 | McDaniel | .............. G01B 5/025 |
| | | | | | 33/203.11 |
| 2005/0257393 | A1 | * | 11/2005 | Spanski | ............... G01B 3/1002 |
| | | | | | 33/758 |
| 2013/0055580 | A1 | * | 3/2013 | Melyon | ................ G01B 3/1082 |
| | | | | | 33/836 |

OTHER PUBLICATIONS

3M, Cold Shrink Connector Insulators 8420 Series (2012).
(Continued)

*Primary Examiner* — Karl D Frech
(74) *Attorney, Agent, or Firm* — Dicke, Billig & Czaja, PLLC

(57) ABSTRACT

A shrink-tubing measurement guide has a flexible strip with a measuring surface and a measurement indicator. Bands on the measuring surface form a tubing size indicator gauge, with each band having a band-specific indicium different from any adjacent band and associating a specific size of shrink tubing. The tubing size indicator gauge has a measuring surface layout based on a circumferential difference between a hand tool body and a hand tool end being compared to a predefined value, where the bands are either aligned end to end along the measuring surface or progressively-staggered with at least one end of each band extending beyond an adjacent band. The flexible strip is configured to be wrapped around a hand tool body of the hand tool with the measurement indicator aligning with at least one of the plurality of bands, where each band-specific indicium identifies a specific shrink tubing size.

18 Claims, 9 Drawing Sheets

(56) References Cited

OTHER PUBLICATIONS

Bridgestone Tire, Motorcycle Tire Grip Chart, available at http://www.motorcycle.com/img/addlinfo/racing_compound_def_250.png.

Spectrum Labs, Relative Pore Sizes for Dialysis Membranes, available at http://www.spectrumlabs.com/dialysis/PoreSize.html.

Dupont, Protective Clothing Sizing chart: Non-Encapsulated Garments, available at http://dupont.com/content/dam/dupont/tools-tactics/dpt/safespec-chem-na/images/sizing_main.jpg.

Planet Headset, Color Coded Earbud Sizing Chart, available at http://planetheadset.com/images/silicone-1.jpg.

Troo Hoops, "About Our Hoops," Collapsible Custom Hoops for Performance, Dance, Fitness & Fun, available at http://www.troohoops.com/about_our_hoops.php.

Adhesive Dispensing Ltd., Dispensing Tip Gauge Size Chart, available at https://www.adhesivedispensing.net/kb_results.asp?ID=223 (Dec. 29, 2012).

Metolius, Trad Gear Specs—Equipment Ranges.

kegoutlet.com, Oetiker Clamp Selection Chart, at *3, available at http://www.kegoutlet.com/oetiker-clamps.html.

engineeringtoolbox.com, Sizing Low Pressure Propane Gas Pipe Lines—Imerial Units, Steel Pipe—Schedule 40, available at http://www.engineeringtoolbox.com/propane-gas-pipe-sizing-d_827.html.

healthyyouweb.com, Seirin J-Type Acupuncture Needle Chart, available at http://www.healthyyouweb.com/Seirin-J-Type-Acupuncture-Needles-p/lhasj.htm.

The Fuel Minder Store, King Combination Tank Alarm/Gauge, available at http://fuelminder.biz/OEM Combo GaugeOEM Combo Gauge.html.

Theraband, Thera-Band Color Progression Chart, available at http://slingshotforum.com/index.php?app=core&module=attach&section=attach&attach_rel_module=post&attach_id=20.

* cited by examiner

MEASUREMENT GUIDE AND METHOD FOR SELECTING SHRINK TUBING FOR INSTALLATION ON HAND TOOLS

BACKGROUND OF THE INVENTION

1. Field of the Invention

The present invention relates generally to measurement devices and more measurement guide for shrink tubing.

2. Description of the Prior Art

Carpenters, construction workers, industrial facility personnel, and other workers regularly use hand tools on a job site. Dropped hand tools can cause injury or death to workers below a work area, damage to equipment, loss of tools, and costly plant shut downs due to dropped tools. For example, a wrench or other hand tool dropped into cooling water at a nuclear facility may require shut down of the system so that the tool can be retrieved. To reduce or prevent inadvertent tool drops, job site safety rules often require workers to tether hand tools to the worker or nearby structure.

One method of tethering a hand tool includes clipping one end of a tether to an opening through the handle of a tool (e.g., an adjustable wrench) and to clip the other end of the tether to the worker's belt or to a nearby structure. When workers properly tether a tool in this way, accidental drops can be eliminated or substantially reduced.

Some hand tools and equipment lack an opening, hook, or other feature that enables the user to securely attach a tether. Tools such as, for example, tubing tongs, valve wheel wrenches, spud wrenches, pipe wrenches, hammers, alignment bars and the like used in construction have posed a particular challenge since these tools often have a smooth handle, two working ends, or a handle that tapers towards one end. Such features render these tools particularly difficult for securely attaching a tether to the tool.

To address this situation, one tethering method uses shrink tubing to connect a tethering tab to the tool, where the tethering tab includes a D-ring connector. One connector strap known to some as a "web tail" is a length of webbing with a first end looped through the connector and then secured to itself to attach the connector loop to the length of webbing. The first end of the webbing provides a first catch where the end of the webbing is doubled on itself. A second end of the webbing is folded or double folded on itself and then stitched together or otherwise secured in this position to define a second catch where the webbing is doubled or tripled on itself.

FIG. 1 illustrates a front perspective view of one embodiment of a web tail 10 that includes a closed-loop connector 15 suitable for attaching a tether (not shown). Web tail 10 has a first catch 12, a second catch 14, and a middle portion 11 between first catch 12 and second catch 14. In one embodiment, web tail 10 is made from a length of webbing 13 with a first end 13a, a second end 13b, and a middle portion 11. Webbing 13 has a front face 13a and a back face 13b. First end 10a is looped through closed-loop connector 15 and secured to the length of webbing 13, such as by stitching. By doing so, closed-loop connector 15 is secured to the length of webbing 13. Also, first end 10a defines a first catch 12 where it meets middle portion 11. Second end 10b is folded on itself and secured to the length of webbing 13, such as by stitching, to define a second catch 14 adjacent middle portion 11 and spaced apart from first catch 12 by middle portion 11. In one embodiment, webbing 13 is woven nylon with a width of about ½ inch and an overall webbing length of about three inches. After folding and securing ends 13a, 13b, web tail 10 has an overall web tail length of about three inches. Other types of webbing and different lengths, widths, and thicknesses are acceptable for web tail 10.

A tethering tab or web tail 10 can be attached to the tool handle by using heat-shrink tubing positioned around the tool handle with the web tail between the heat-shrink tubing. First, a tethering tab is aligned with and placed along the tool handle or other convenient portion of the hand tool. Next, a length of heat-shrink tubing is positioned over the hand tool and body of the tethering tab with the closed-loop connector extending out from the tubing and positioned for attachment to a tether. The first catch and the second catch are typically positioned outside and beyond the ends of the shrink tubing. After positioning the heat-shrink tubing, the tubing is heated to constrict it to a smaller size and conform to the tool handle and tethering tab. Heat-shrink tubing installed in this manner is useful to attach a tethering tab to the tool handle for small, light-weight tools, such as a writing implement or screwdriver.

Referring now to FIG. 2, a perspective view illustrates web tail 10 positioned against and aligned longitudinally with an installation portion 6 of an implement or hand tool 5. First catch 12 and second catch 14 each face outwardly away from hand tool 5. Shrink tubing 20 is installed over middle portion 11 of web tail 10 and installation portion 6 of hand tool 5.

SUMMARY OF THE INVENTION

Unfortunately, much time is wasted in an effort to determine the tubing with the correct size and load rating for a given tool installation. While one piece of tubing may appear to be appropriate when it is in its expanded state, the user may realize at the time of installation that the tubing is incorrectly sized after "shrinking" the tubing. For example, cold-shrink tubing is commonly supplied in an expanded state on a plastic support structure that can be unraveled from inside the tubing to allow the tubing to collapse on an object. In addition to wasting time to remove the incorrect tubing from the tool, such a trial-and-error method wastes tethering supplies and therefore increases costs. Additionally, even when a piece of shrink tubing does appropriately fit the tool, the tubing may not have the correct load rating for a given hand tool. Thus, the task of selecting the correct tubing for the particular hand tool is complicated by having to properly select the tubing based on load. Selecting the proper shrink tubing is further complicated when one selects shrink tubing for a tool with abrupt change in geometry along the handle versus a tool without such geometry. For tools with an abrupt change in geometry adjacent to the installation portion, a different size of shrink tubing sometimes must be used. Considering the many factors that go into properly selecting shrink tubing for tethering applications, workers fail to follow proper procedure for tethering tools because of mistake or due to the hassle associated with identifying the correct shrink tubing. When tethering fails, a dropped tool can be disastrous.

Therefore, what is needed is a device and method that more quickly and easily enables the worker to identify the proper shrink tubing for a given tool. The present invention achieves these and other objectives by providing a measurement guide and method of selecting shrink tubing for hand tools.

One aspect of the present invention is directed to a measurement guide to assist in selecting a shrink tubing for installation of a tether-attaching structure on a hand tool. In one embodiment, the measurement guide has a flexible strip with a first strip end, a second strip end and a measuring surface. A measurement indicator is on the flexible strip and proximate the first strip end. A plurality of bands is disposed on the measuring surface and forms a tubing size indicator gauge. Each of the bands has a band-specific indicia different from any adjacent band, where the band-specific indicia associates a specific size of shrink tubing with one of the bands. The tubing size indicator gauge has a measuring surface layout based on the geometry of the hand tool.

In a first measuring surface layout, each of the bands is aligned end-to-end along the measuring surface and each band has a predefined length representing a range of circumferences. The first measuring surface layout is selected when a circumferential difference between a hand tool body and a hand tool end is less than an absolute value of 50%. In other words, the hand tool has a first circumference at an installation portion and a second circumference at geometry adjacent the installation portion where the second circumference is less than 50% greater than the first circumference.

In a second measuring surface layout, each of the bands is laterally spaced from each other and each band has a predefined length, where at least one end of each band longitudinally extends beyond and along an adjacent band. The bands are progressively staggered relative to each other longitudinally along the measuring surface. The second measuring surface layout is selected when the circumferential difference between a hand tool body and a hand tool end is greater than or equal to a predefined absolute value. In other words, the hand tool has a first circumference at an installation portion and a second circumference at geometry adjacent the installation portion where the second circumference does not exceed the first circumference by the predefined value. Each band-specific indicium (or indicia) identifies a specific shrink tubing size. The flexible strip is configured to be wrapped around a hand tool body of the hand tool with the measurement indicator aligning with at least one of the bands.

In one embodiment, the measurement guide is configured for cold-shrink tubing and the predefined absolute value of the circumferential difference is from about 10% to about 60%. In one embodiment, the predefined absolute value of the circumferential difference is 50%. In other embodiments, the measurement guide is configured for heat-shrink tubing and the predefined absolute value of the circumferential difference is from about 10% to about 20%, such as 15%.

In some embodiments, the measurement indicator is the first strip end.

In some embodiment, the measurement guide includes a first ruler on the flexible strip. The first ruler has a first scale that is typically in U.S. customary units or in metric units. In other embodiments, the measurement guide also includes a second ruler on the flexible strip, where the second ruler has a second scale that relates to the first scale by a predetermined ratio of the first circumference, i.e. circumference of the hand tool body, to the second circumference, i.e. circumference of the hand tool end.

Another aspect of the present invention is directed to a method of selecting shrink tubing for installation of a tether attaching structure on a hand tool. In one embodiment, the method includes the steps of selecting a measurement guide with a measuring surface layout based on the absolute value of the circumferential difference between the hand tool body and the hand tool end; providing an embodiment of the measurement guide discussed above based on the circumferential difference between the hand tool body and the hand tool end; wrapping the flexible strip around the hand tool body so that the measurement indicator overlaps the measuring surface and aligns with one or more of the plurality of bands; confirming the hand tool is less than or equal to a maximum tool weight rating of the shrink tubing identified by the band(s) aligned with the measurement indicator; and selecting the shrink tubing based on the band(s) aligned with the measurement indicator.

In another embodiment, the method also includes measuring a first circumference of the installation portion or hand tool body; measuring a second circumference of a geometry adjacent the installation portion, where the second circumference is greater than the first circumference; and comparing the increase from the first circumference measurement and the second circumference measurement to a predefined cutoff value to determine if the geometry is an abrupt geometry. In one embodiment, the increase from the first circumference measurement to the second circumference measurement is performed by (1) calculating a percent change from the first circumference to the second circumference, (2) calculating a ratio of the second circumference to the first circumference, or (3) determining whether the second circumference is greater than the first circumference by a predefined value.

In another embodiment, the method also includes selecting the flexible strip by providing a first ruler with a first measurement scale and a second ruler with a second measurement scale, where the second measurement scale is a predefined ratio of the first measurement scale based on a predefined absolute value of a selected circumferential difference between the hand tool body and the hand tool end for determining the flexible strip to use for selecting the shrink tubing; measuring a first circumference of the installation portion using the first measurement scale; measuring a second circumference of a geometry adjacent the installation portion using the second measurement scale; and comparing the first circumference to the second circumference.

In another embodiment, the method also includes selecting an installation portion of the hand tool for installation of the shrink tubing, where the portion is adjacent an abrupt geometry having a second circumference greater than the first circumference; calculating a change from the first circumference to the second circumference; determining that the portion of the hand tool lacks an abrupt geometry based on the second circumference being less than 150% (or other predefined value) of the first circumference; using the measurement guide having the measuring surface layout wherein each band of the plurality of bands is aligned end to end along the measuring surface; wrapping a plurality concentric layers of self-amalgamating tape around a middle part of the installation portion of the hand tool; and installing the shrink tubing over the installation portion of the hand tool and the self-amalgamating tape.

Another aspect of the present invention is directed to a kit for selecting and installing shrink tubing with a tether attaching structure on a hand tool. In one embodiment, the kit includes a measurement guide as discussed above; a plurality of pieces of shrink tubing, where each of the pieces of shrink tubing has indicia specific to a predefined length and a predefined inside diameter associated with a specific band on the measuring surface; and instructions for selecting the flexible strip with a measuring surface layout based on the absolute value of the circumferential difference between a hand tool body and a hand tool end, and for using the selected flexible strip to select one of the pieces of shrink tubing based on a hand tool circumference and a hand tool weight.

DETAILED DESCRIPTION

Figure 3:
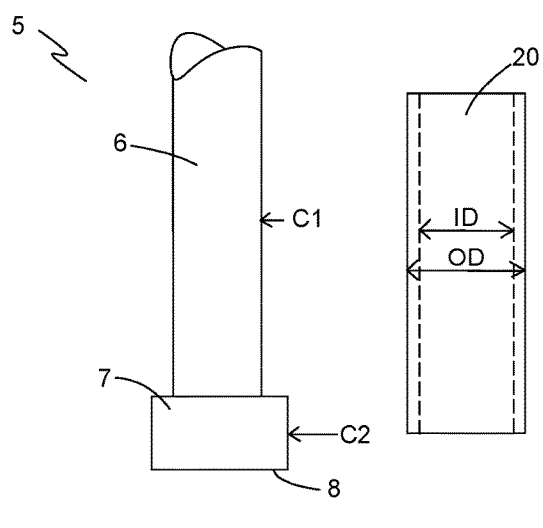
FIG. 3 illustrates an elevational view of a portion of a hand tool with abrupt geometry and a length of shrink tubing.

Embodiments of the present invention are illustrated in FIGS. 3-20. Referring to FIG. 3, a front, perspective view illustrates part of one embodiment of hand tool 5 and a length of shrink tubing 20 to be installed on installation portion or hand tool body 6 of hand tool 5. Installation portion 6 of implement 5 has a first circumference C1. Implement 5 in some cases has an abrupt geometry 7, which may or may not be located at or include an end 8 of hand tool 5. Abrupt geometry 7 has a second circumference C2 that is greater than first circumference C1. In cases where second circumference C2 is about 150% or more of first circumference C1, shrink tubing of a different size, different shrink ratio, and/or different load rating may be used due to the inner diameter required to clear abrupt geometry 7 and due to the holding effect of abrupt geometry 7. This contrasts a similar tool handle without abrupt geometry 7 that allows shrink tubing 20 to slip towards end 8 and eventually off of hand tool 5 after repeated drops.

Shrink tubing 20 has a tubing inner diameter ID and a tubing outer diameter OD. Shrink tubing 20 in one embodiment is cold-shrink tubing. Cold-shrink tubing is typically supplied with a removable support structure inside the tubing that maintains the shrink tubing 20 in an expanded or stretched state. The support structure is unwound from shrink tubing 20 to remove it and allow shrink tubing 20 to resume a smaller, more relaxed state. In other embodiments, shrink tubing 20 is cold-shrink tubing supplied in a smaller, resting state. The user then stretches the cold-shrink tubing using a mandrel or the like and then installs the stretched shrink tubing 20 on hand tool 5. For cold-shrink tubing, the gripping strength increases with the amount of expansion from the relaxed, smaller state due to elastic forces scaling with the amount of expansion from the relaxed state. Thus, for two tools of the same weight but with handles of different sizes, a length of cold-shrink tubing in some cases will adequately hold the tool with the larger handle, but will lack sufficient grip on the smaller handle due to the reduced holding strength of the cold-shrink tubing when allowed to relax to the smaller size of the smaller handle.

Figure 4:
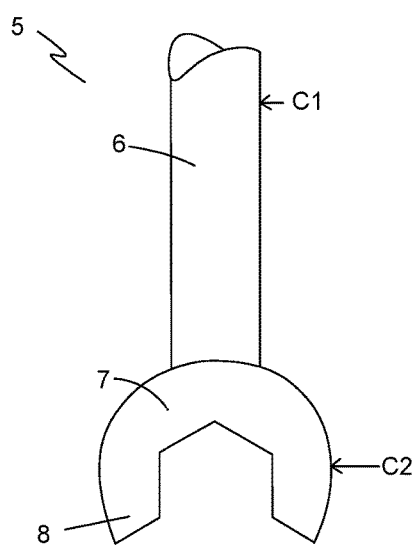
FIG. 4 illustrates a portion of a hand tool with abrupt geometry shown as an open-box wrench.
Figure 4A:
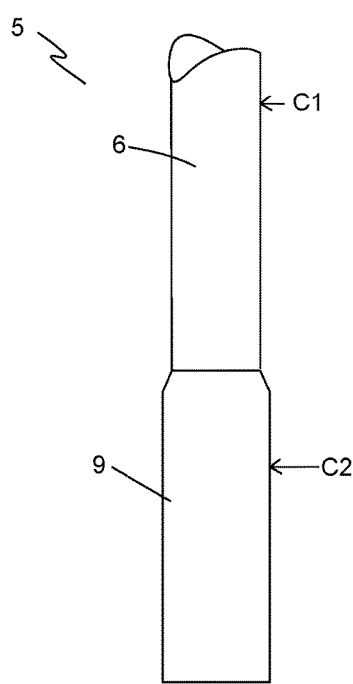
FIG. 4A illustrates a portion of a hand tool without abrupt geometry and shown as the handle of a ratchet wrench.
Figure 5:
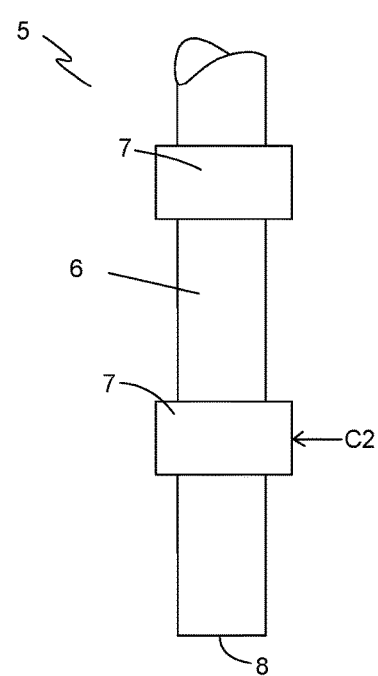
FIG. 5 illustrates another example of a portion of a hand tool having multiple abrupt geometries.

FIG. 4 illustrates a portion of another example of hand tool 5 where abrupt geometry 7 is a working end 8 of the hand tool 5. As shown here, the abrupt geometry 7 of a box-end wrench is a physical barrier that prevents shrink tubing 20 from sliding off of the wrench. FIG. 4A illustrates a portion of hand tool 5 lacking a sufficiently abrupt geometry, such as the handle of a ratchet wrench. Installation portion 6 has first circumference C1 and handle 9 has second circumference C2 that is slightly larger than C1. FIG. 5 illustrates a portion of yet another example of hand tool 5, where installation portion 6 of hand tool 5 includes two abrupt geometries 7. In some cases as shown, abrupt geometries 7 do not include end 8 of hand tool 5.

Figure 1:
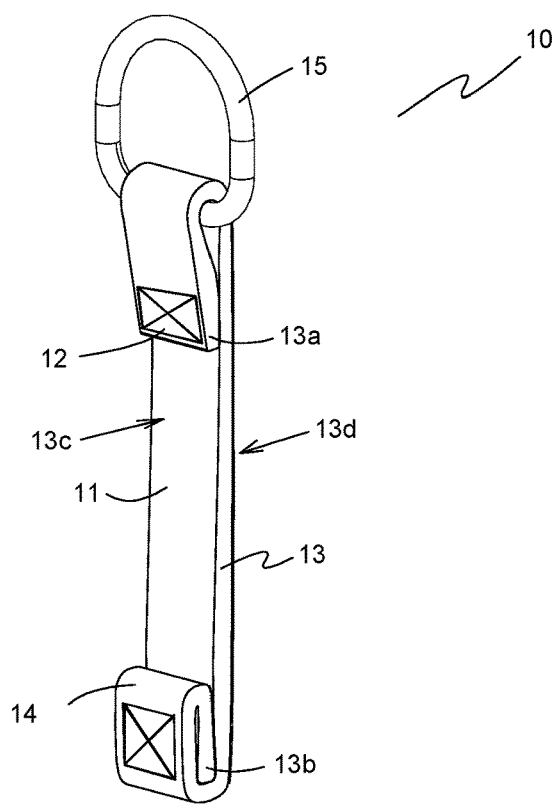
FIG. 1 illustrates a front perspective view of one embodiment of a web tail usable with the present invention.
Figure 2:
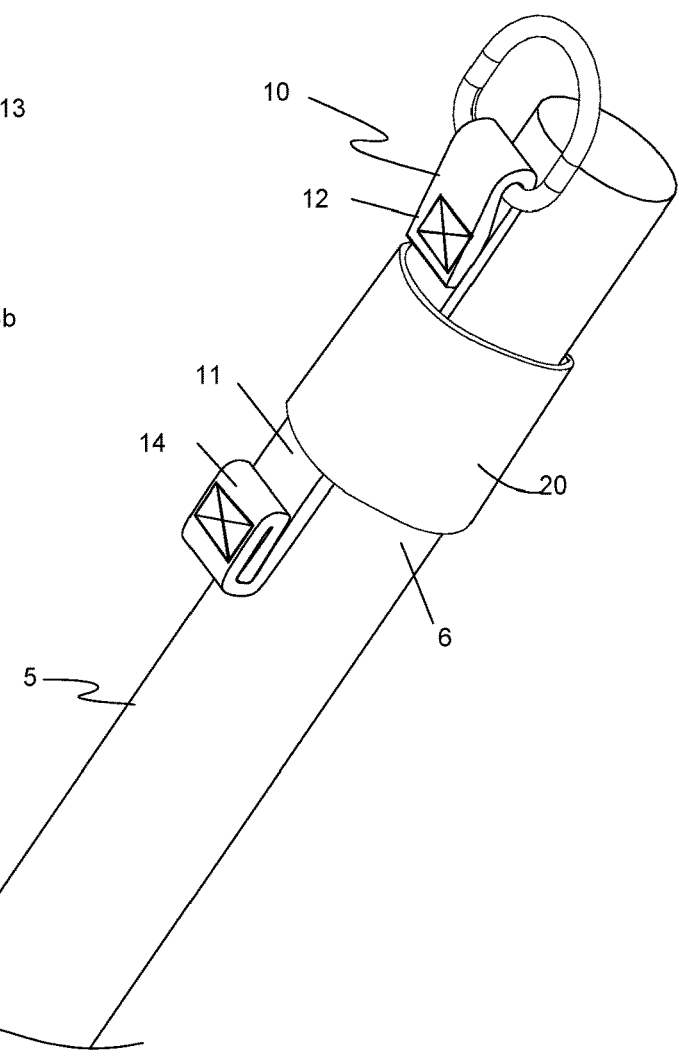
FIG. 2 illustrates a perspective view of the web tail of FIG. 1 aligned with and placed against an implement with a length of shrink tubing installed over the web tail and portion of the implement.

Based on the presence or lack of abrupt geometry 7 on hand tool 5, the tubing ID of shrink tubing 20 may be chosen to fit over the abrupt geometry 7, but also to have a shrink ratio sufficient to snugly engage installation portion 6 of hand tool 5 (and web tail 10 (shown in FIGS. 1-2) or other tethering device 24 (shown in FIG. 15) when present) when shrink tubing 20 converts to the smaller size. Thus, first circumference C1 and second circumference C2 dictate a minimum tubing ID in the expanded state, a maximum tubing ID in the relaxed state, and a shrink ratio. The weight of hand tool 5 also dictates the maximum load capacity of shrink tubing 20. When abrupt geometry 7 of an adequate size is present, it is a physical barrier that prevents shrink tubing 20 from being pulled off of end 8 of hand tool 5 and therefore dictates a different holding strength capacity or shrink ratio for shrink tubing 20. Based on these various structural considerations, selection of the proper size, load rating, and shrink ratio for shrink tubing 20 is quite challenging. An advantage of the present invention is the simplification of selecting the right shrink tubing 20.

Figure 6:
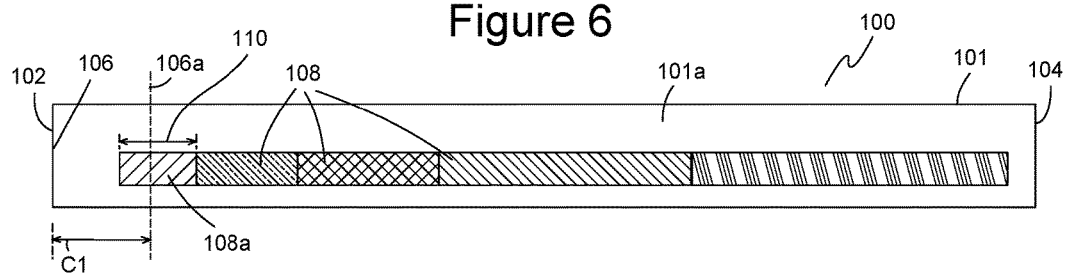
FIG. 6 illustrates a plan view of one embodiment of a measurement guide of the present invention showing indicia with a bar shape and arranged in a continuous linear group.
Figure 7:
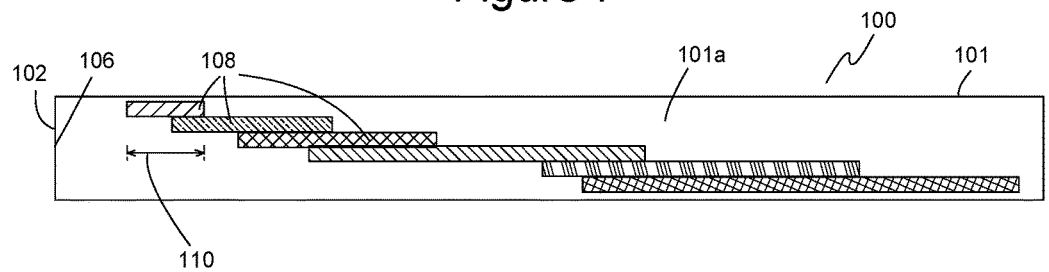
FIG. 7 illustrates a plan view of another embodiment of a measurement guide of the present invention for tools with abrupt geometry and showing indicia shaped as stacked bars between the ends of the strip and having overlapping ranges.

Referring now to FIGS. 6 and 7, embodiments of a measurement guide 100 are shown. Measurement guide 100 is a flexible strip 101 extending from a first strip end 102 to a second strip end 104. Flexible strip 101 has a measurement surface 101a. Measurement guide 100 has a measurement indicator 106 at, near, or proximate first strip end 102. In some embodiments, measurement indicator is a line, an arrow, a slot, first strip end 102, or other structure indicating the location where the measurement is observed when flexible strip 101 is wrapped around hand tool 5. Measurement guide 100 also includes a plurality of bands 108 between first strip end 202 and second strip end 204, where each band 108 extends along the flexible strip and defines a range 110 of tool circumferences C for which the corresponding shrink tubing 20 is sized.

Each band 108 relates to shrink tubing 20 of a predetermined tubing size (e.g., tubing ID in the expanded state, tubing OD in the relaxed state) and pre-determined maximum load, where the pre-determined tubing size is adapted to snugly engage a range 110 of tool first circumferences C1 when shrink tubing 20 converts to a smaller, more constricted size. For example, band 108a shows a usable range 110a of first circumferences C1 defined by the distance from measurement indicator 106 (here, first strip end 102) to any line 106a parallel to measurement indicator 106 and passing through band 108a. First circumference C1 of hand tool 5 is determined, for example, by wrapping measurement guide 100 around installation portion 6 and viewing where measurement indicator is positioned along flexible strip 101 when flexible strip 101 wraps completely one time around installation portion 6 of hand tool 5. When measurement indicator 106 is aligned within the range of one or more band 108, each such band 108 indicates an appropriate size(s) of shrink tubing 20 for installation portion 6. Other indicia such as, for example, labels, color coding, shading, codes, or other structure on bands 108 or flexible strip 101 communicate the maximum weight of hand tool 5 for shrink tubing 20 corresponding to each band 108. In the embodiment of FIG. 6, bands 108 are arranged linearly and end-to-end along flexible strip 101 without overlap. Bands 108 as a group define a continuous range of first circumferences C1.

Referring to FIG. 7, another embodiment of measurement guide 100 is shown, where ranges 110 of adjacent bands 108 are laterally spaced and extend along adjacent bands 108 with ranges 110 that overlap. As with the embodiment of measurement guide 100 of FIG. 6, each band 108 represents a range 110 of acceptable first circumference C1 as measured from measurement indicator 106 (first strip end 102 as illustrated.) As discussed above, each band 108 also identifies a pre-determined maximum load capacity for shrink tubing 20. Measurement guide 100 of FIG. 7 is adapted for use with hand tool 5 having first circumference C1 and second circumference C2, where second circumference C2 is greater than first circumference C1 by a predefined value. For example, second circumference C2 is measured for abrupt geometry 7 (shown in FIG. 4) and second circumference C2 is 50% or more than first circumference C1. For hand tools 5 with abrupt geometry 7, bands 108 are progressively arranged on measurement surface 101a. Thus, measurement guide 100 facilitates choosing the proper shrink tubing 20 for hand tool 5 based on first circumference C1, second circumference C2, and the weight of hand tool 5.

Figure 16:
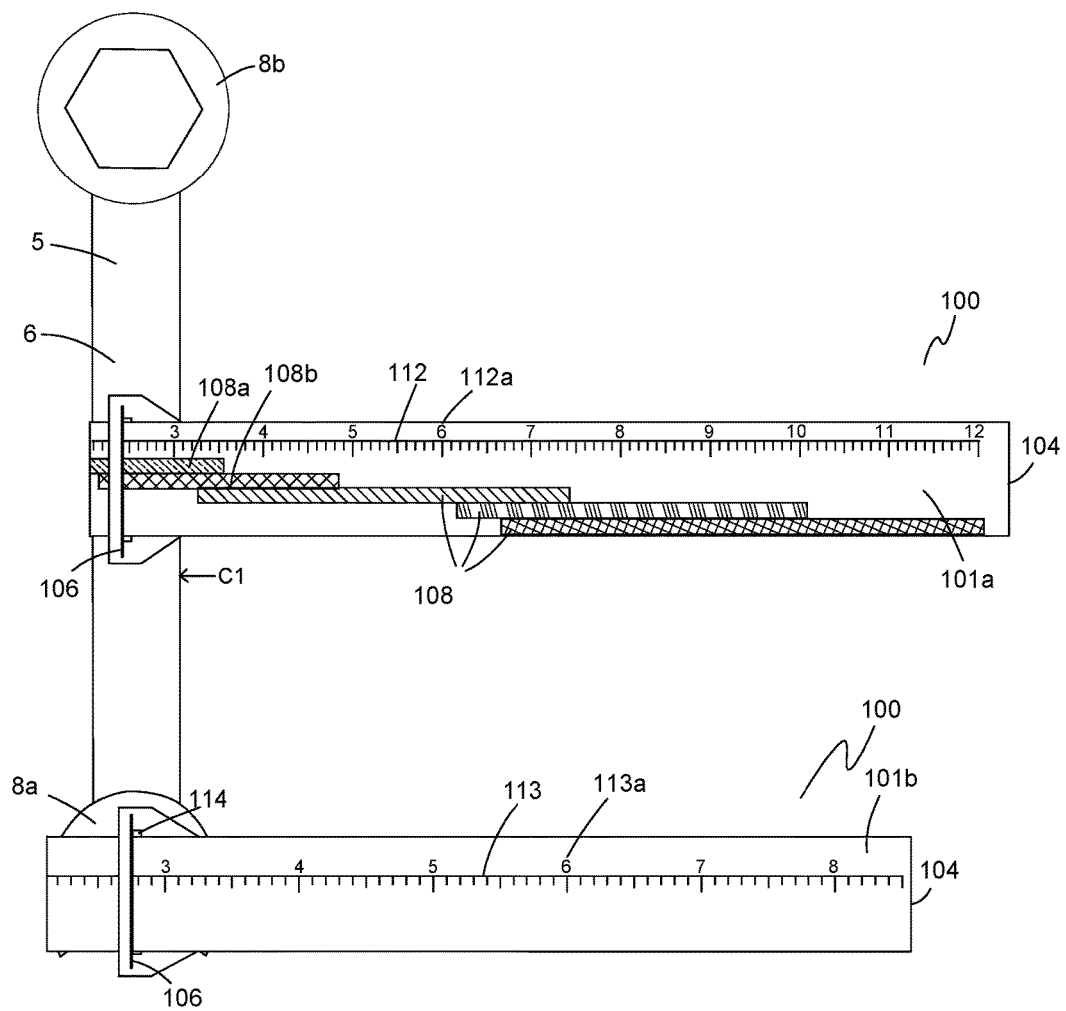
FIG. 16 illustrates an elevational view of an exemplary hand tool and measurement guide showing how the measurement guide may be used to select shrink tubing.

An example of abrupt geometry is an open box wrench compared to the handle of the wrench as shown, for example, in FIG. 16. The closed box end 8b of the wrench is also an example of abrupt geometry 7 (shown in FIG. 17). First and second circumferences C1, C2 are used in a calculation or comparison with reference to a predefined cutoff value.

In one embodiment, the predefined value is the ratio C2/C1. If the ratio C2/C1 is greater than or equal to the predefined cutoff value, such as 1.5, then measurement guide 100 for tools with abrupt geometry 7 may be used. If the ratio C2/C1 is less than the predefined cutoff value, then measurement guide 100 for tools without abrupt geometry 7 is used (shown in FIG. 6). For an open box wrench, the ratio C2/C1 is typically about 2.0. A ratio of 1.5 was found to be a useful cutoff value for cold-shrink tubing installed on hand tools 5 commonly used in the material-exclusion industries, such as box-end wrenches, ratchet wrenches, alignment bars, and the like. The C2/C1 ratio of 1.5 has also shown to be a useful cutoff value for cold-shrink tubing commonly available, such as EPDM rubber tubing made by 3M Corporation and sold as Cold Shrink Connector Insulators 8420 Series or equivalent. The C2/C1 ratio of 1.5 has also been found useful for enabling one to select a series of four to six sizes of shrink tubing 20 with ranges of circumferences that can be arranged in a measuring surface layout with bands end-to-end or progressively staggered.

Other values for the ratio are also acceptable for cold-shrink tubing, including values from about 1.1 to about 1.7 such as 1.1, 1.2, 1.3, 1.4, 1.6, 1.7 and others. As abrupt geometry 7 nears the tubing ID of cold-shrink tubing in its expanded state, a ratio of C2/C1 as low as 1.1 is acceptable since elastic forces of the cold-shrink tubing are much stronger in the expanded state on a removable support. In other words, the necessary increase in diameter from first circumference C1 to second circumference C2 becomes smaller as abrupt geometry 7 nears the tubing ID of the cold-shrink tubing in the expanded state as provided on a removable support. Still other cutoff values may be used as appropriate for a particular group of tools or particular shrink tubing 20. Differences in tubing sizes, tubing materials, shrink type, wall thickness, shrink ratio, and other properties of shrink tubing 20 as well as the types, sizes, geometry, materials, and other properties of hand tool 5 may dictate the best value for the ratio C2/C1 or other relationship between C2 and C1.

For heat-shrink tubing, the ratio C2/C1 equal to about 1.15 has been found experimentally to be a useful value (i.e., an increase of about 15% from C1 to C2.) Of course, other values of the ratio C2/C1 for heat-shrink tubing are acceptable, such as values from about 1.10 to about 1.20.

Calculated another way, the predefined cutoff value may be the percentage of increase from C1 to C2 calculated using the formula: % increase=(C2−C1)/C1×100. The predefined cutoff value is then expressed as a percent increase in circumference or size from C1 to C2.

Figure 8:
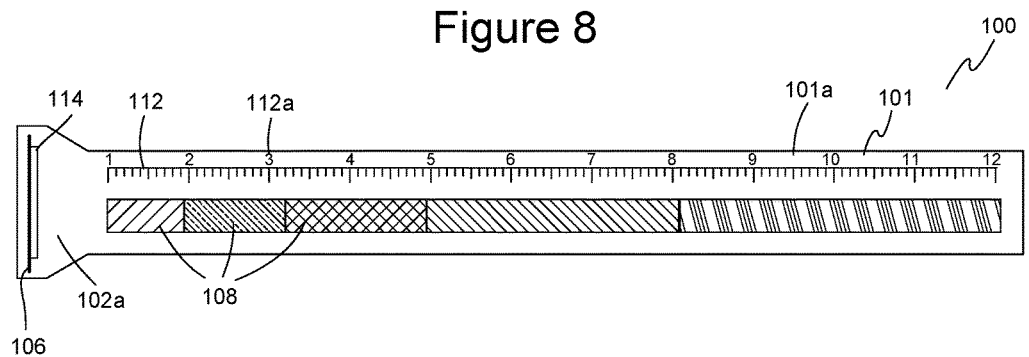
FIG. 8 illustrates a plan view of another embodiment of a measurement guide of the present invention showing an optional first ruler with first measurement scale, an optional enlarged first end portion, and an optional slot.

Referring now to FIG. 8, front side or measurement surface 101a of flexible strip 101 is illustrated for another embodiment of measurement guide 100. Here, measurement guide 100 includes optional features of a ruler 112, a slot 114 and enlarged first end portion 102a. To facilitate quick and accurate measurements, flexible strip 101 may be wrapped around hand tool 5 with second strip end 104 passing through slot 114 in enlarged first end portion 102a. Measurement indicator 106 (a line as illustrated) is located immediately next to slot 114. As the user pulls second strip end 104 through slot 114, flexible strip 101 can be tightened around hand tool 5. The user may then hold hand tool 5 in one hand while pulling second strip end 104 taut with the other hand, thereby enabling a clear view of measurement indicator 106 aligned along one or more bands 108. Using the same technique, optional ruler 112 with a first scale 112a enables the user to measure a numerical value for first circumference C1, second circumference C2, or other circumference measurement. For example, first scale 112 is defined as one unit equal to one inch.

Figure 9:
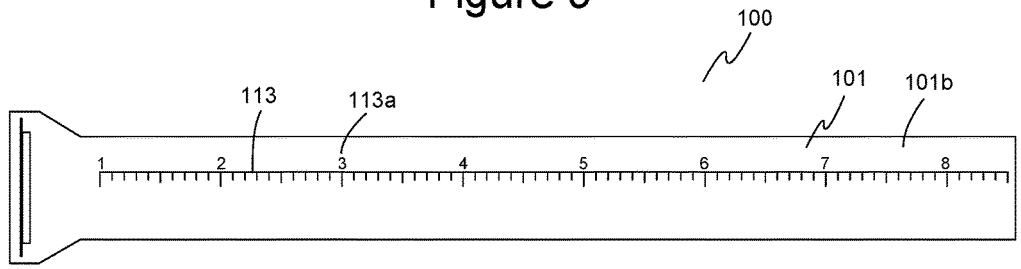
FIG. 9 illustrates a plan view of a back side of another embodiment of a measurement guide of the present invention showing an optional second ruler with a second measurement scale.

Referring now to FIG. 9, measurement guide 100 of FIG. 8 is illustrated showing an optional second ruler 113 on a back side 101b of flexible strip 101. In some embodiments, first ruler 112 (shown in FIG. 8) and/or second ruler 113 are part of a measurement strip separate from measurement guide 100. Here, back side 101b of measurement strip 100 includes optional second ruler 113 with a second scale 113a that is different from first scale 112a. In one embodiment, second scale 113a defines one unit equal to one inch, one centimeter, or other unit of measurement. Second scale 113b in other embodiments relates to first scale 112a by the predefined value of ratio C2/C1. For example, first ruler 112 (shown in FIG. 8) has first scale 112a where one unit is equal to one inch; second ruler 113 has second scale 113a with one unit equal to 1.5 inches, where 1.5 is the predefined cutoff value equal to the ratio of second circumference C2 to first circumference C1. Consequently, the numbers on second scale 113a provide a scaled second circumference measurement of C2'. In such embodiments, first ruler 112 and second ruler 113 can be used to determine whether hand tool 5 has abrupt geometry 7 (shown in FIG. 16) with a size satisfying the predefined value of ratio C2/C1 or percent increase from C1 to C2. Based on meeting or not meeting this condition, the user selects the embodiment of measurement guide 100 appropriate for hand tool 5 having or lacking abrupt geometry 7, respectively.

Table 1 below provides an example of shrink tubing 20 and corresponding bands 108 for embodiments of measurement guide 100 for hand tool 5 without abrupt geometry (such as in FIG. 6), where measurement guide 100 is adapted for EPDM cold-shrink tubing. Tubing sizes listed in Table 1 are the sizes of cold-shrink tubing as supplied in the expanded state on a removable core. For example in Table 1, the blue band is 0.55 inches long, the green band is 1.1 inches long, the orange band is 0.8 inches long, the purple band is 1.6 inches long, the red band is 2.15 inches long, and the yellow band is 3.4 inches long.

The maximum tool weight in Tables 1-6 discussed below was determined by drop-test experiments with a tether four feet in length attached to tethering device 24 (shown in FIG. 17). Hand tool 5 (a box-end wrench) was dropped from above the anchor point for a total drop distance of eight feet.

TABLE 1 cold-shrink tubing

| Band Color | C1 Minimum | C1 Maximum | Tubing size ID × length | Max tool weight |
|---|---|---|---|---|
| Blue | 1.15" | 1.7" | 1" × 2" | 1.5 lbs. |
| Green | 1.7" | 2.8" | 1.4" × 2.25" | 1.5 lbs. |
| Orange | 2.8" | 3.6" | 1.5" × 2.5" | 3.0 lbs. |
| Purple | 3.6" | 5.2" | 2.1" × 2.75" | 3.0 lbs. |
| Red | 5.2" | 7.35" | 2.75" × 3" | 4.0 lbs. |
| Yellow | 7.35" | 10.75" | 4.1" × 3.5" | 4 lbs. |

Figure 10:
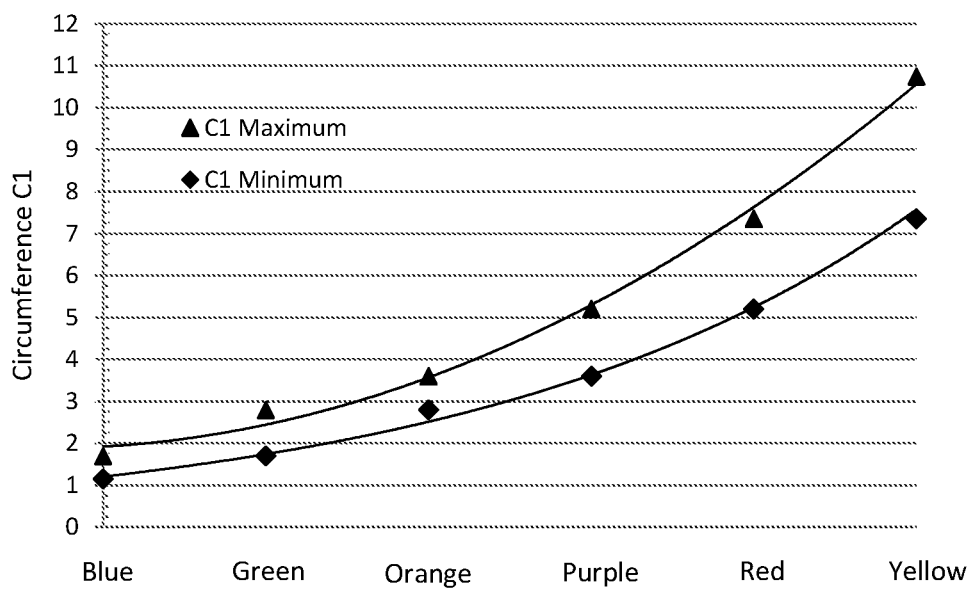
FIG. 10 is a graphical representation of the data in Table 1 showing the minimum and maximum circumferences for various sizes of shrink tubing in Table 1.

FIG. 10 is a graphical representation of the data in Table 1 showing the minimum and maximum circumferences for various sizes of shrink tubing identified by band colors in Table 1. For shrink tubing 20 identified by each band color, FIG. 10 plots the minimum and maximum values of first circumference C1 on the Y axis and the band color on the X axis. The vertical distance between the minimum and maximum value of C1 is the length of the band 108 on measurement guide 100. As shown in the graphical representation of FIG. 10, the minimum and maximum values of first circumference C1 generally follow an exponential trend. Here, a trend line for the minimum circumference C1 has the equation $Y=0.1786X^2-0.0414X+1.07$ and has an $R^2$ value of 0.9957. A trend line for the maximum circumference C1 has the equation $Y=0.3018X^2-0.3839X+2$ and has an $R^2$ value of 0.9947. For the cold-shrink tubing corresponding to the particular embodiment, the exponential trend is likely a result of the tubing sizes available from manufacturers. Other tubing sizes are also acceptable, such as those having a linear trend or an increase of a fixed amount between each minimum or maximum circumference value.

Table 2 below provides another example of shrink tubing 20 and corresponding bands 108 for embodiments of measurement guide 100 for hand tool 5 without abrupt geometry, where measurement guide 100 is adapted for EPDM cold-shrink tubing. Tubing sizes listed in Table 2 are the sizes of cold-shrink tubing as supplied in the expanded state on a removable core. For example in Table 2, the blue band is 0.55 inches long, the green band is 1.05 inches long, the orange band is 0.8 inches long, the purple band is 1.55 inches long, the red band is 2.25 inches long, and the yellow band is 3.4 inches long.

TABLE 2 cold-shrink tubing

| Band Color | C1 Minimum | C1 Maximum | Tubing size ID × length | Max tool weight |
|---|---|---|---|---|
| Blue | 1.2" | 1.75" | 1" × 2" | 1.5 lbs. |
| Green | 1.75" | 2.8" | 1.4" × 2.25" | 1.5 lbs. |
| Orange | 2.8" | 3.6" | 1.5" × 2.5" | 3.0 lbs. |
| Purple | 3.6" | 5.15" | 2.1" × 2.75" | 3.0 lbs. |
| Red | 5.15" | 7.4" | 2.75" × 3" | 4.0 lbs. |
| Yellow | 7.4" | 10.8" | 4.1" × 3.5" | 4 lbs. |

Figure 11:
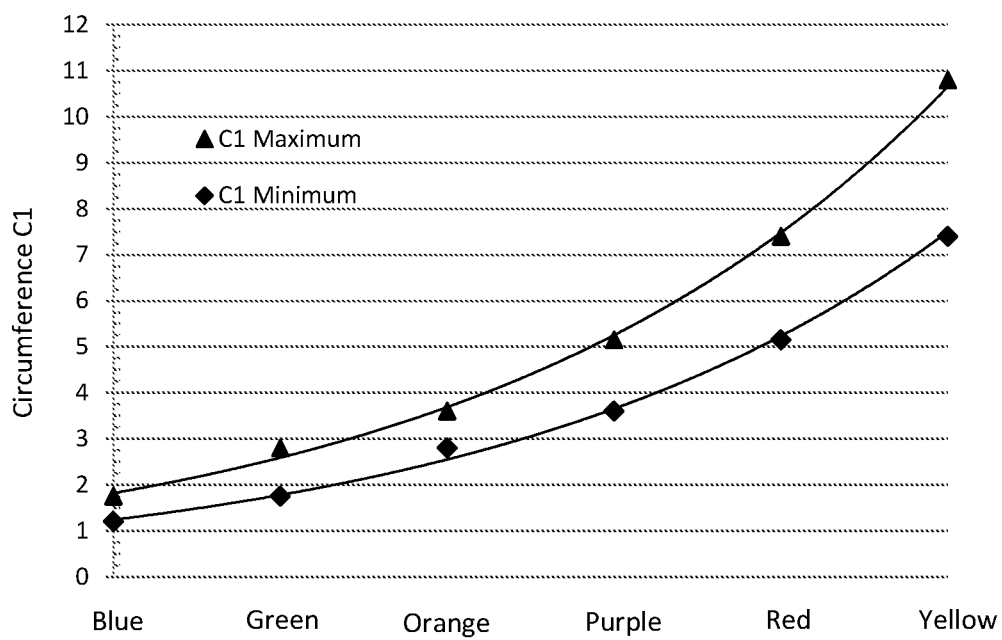
FIG. 11 is a graphical representation of the data in Table 2 showing the minimum and maximum circumferences for various sizes of shrink tubing in Table 2.

FIG. 11 is a graphical representation of the data in Table 2 showing the minimum and maximum circumferences for various sizes of shrink tubing identified by band colors in Table 2. For shrink tubing 20 identified by each band color, FIG. 11 plots the minimum and maximum values of first circumference C1 on the Y axis and the band color on the X axis. The vertical distance between the minimum and maximum value of C1 is the length of the band 108 on measurement guide 100. As shown in the graphical representation of FIG. 11, the minimum and maximum values of first circumference C1 also generally follow an exponential trend. Here, a trend line for the minimum circumference C1 has the equation $Y=0.1875X^2-0.1125X+1.2$ and has an $R^2$ value of 0.9948. A trend line for the maximum circumference C1 has the equation $Y=0.3134X^2-0.4623X+2.115$ and has an $R^2$ value of 0.995. As above, for cold-shrink tubing corresponding to the particular embodiment, the exponential trend is likely a result of the tubing sizes available from manufacturers. Other tubing sizes are also acceptable, such as tubing having a linear trend or an increase of a fixed amount between each minimum or maximum circumference value.

Table 3 below provides an example of shrink tubing 20 and corresponding bands 108 of first circumferences C1 for one embodiment of measurement guide 100 for hand tool 5 with abrupt geometry with the ratio of C2/C1 greater than or equal to 1.5, where measurement guide 100 is adapted for cold-shrink tubing. Tubing sizes listed in Table 3 are sizes of EPDM cold-shrink tubing as supplied in the expanded state on a removable core. The band lengths on measurement guide 100 are equal to the difference between C1 maximum and C1 minimum. For example in Table 3, the blue band is 0.8 inches long, the green band is 1.8 inches long, the orange band is 2 inches long, the purple band is 2.85 inches long, the red band is 4.65 inches long, and the yellow band is 5.8 inches long.

TABLE 3 cold-shrink tubing

| Band Color | C1 minimum | C1 maximum | Tubing size ID × length | Max tool weight |
|---|---|---|---|---|
| Blue | 1.2" | 2" | 1" × 2" | 1.5 lbs. |
| Green | 1.4" | 3.2" | 1.4" × 2.25" | 2.0 lbs. |
| Orange | 1.7" | 3.7" | 1.6" × 2.5" | 3.0 lbs. |
| Purple | 2.35" | 5.2" | 2.1" × 2.75" | 4.0 lbs. |
| Red | 3.15" | 7.8" | 2.75" × 3" | 8.0 lbs. |
| Yellow | 5.2" | 11.0" | 4.1" × 3.5" | 10 lbs. |

Figure 12:
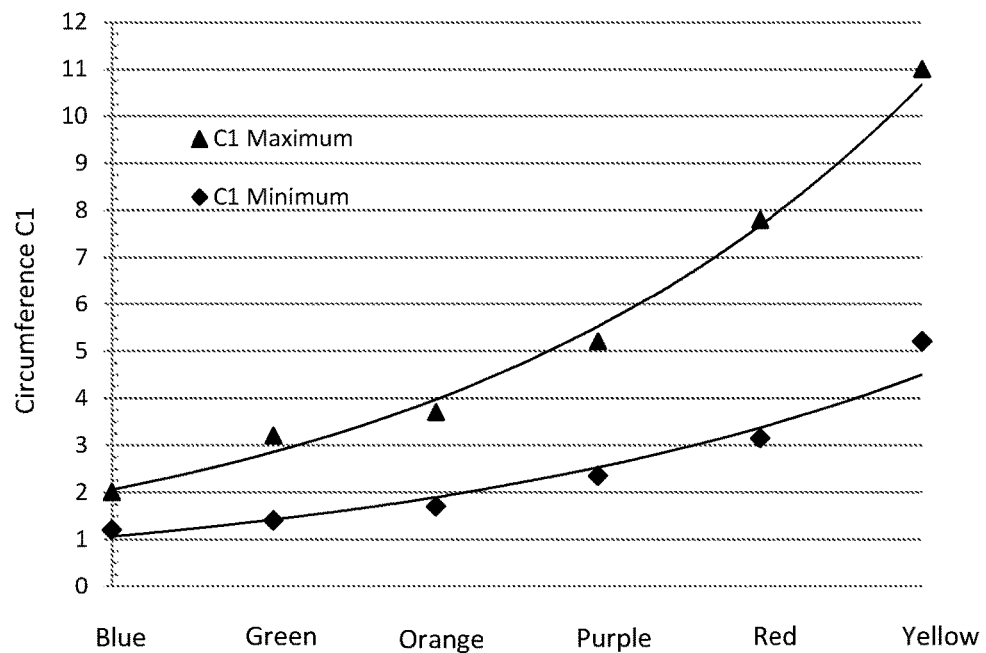
FIG. 12 is a graphical representation of the data in Table 3 showing the minimum and maximum circumferences for various sizes of shrink tubing in Table 3.

FIG. 12 is a graphical representation of the data in Table 3 showing the minimum and maximum circumferences for various sizes of shrink tubing identified by band colors in Table 3. For shrink tubing 20 identified by each band color, FIG. 12 plots the minimum and maximum values of first circumference C1 on the Y axis and the band color on the X axis. The vertical distance between the minimum and maximum values of C1 is the length of the band 108 on measurement guide 100. As shown in the graphical representation of FIG. 12, the minimum and maximum values of first circumference C1 also generally follow an exponential trend. Here, a trend line for the minimum circumference C1 has the equation $Y=0.2009X^2-0.6662X+1.785$ and has an $R^2$ value of 0.9936. A trend line for the maximum circumference C1 has the equation $Y=0.3286X^2-0.5771X+2.52$ and has an $R^2$ value of 0.9923. As above, for cold-shrink tubing corresponding to the particular embodiment, the exponential trend is likely a result of the tubing sizes available from manufacturers. Other tubing sizes are also acceptable, such as tubing having a linear trend or an increase of a fixed amount between each minimum or maximum circumference value.

Table 4 below provides an example of shrink tubing 20 and corresponding bands 108 of first circumferences C1 for one embodiment of measurement guide 100 for hand tool 5 with abrupt geometry with the ratio of C2/C1 greater than or equal to 1.5, where measurement guide 100 is adapted for cold-shrink tubing. Tubing sizes listed in Table 4 are sizes of EPDM cold-shrink tubing as supplied in the expanded state on a removable core. The band lengths on measurement guide 100 are equal to the difference between C1 maximum and C1 minimum. For example in Table 4, the blue band is 0.24 inches long, the green band is 0.57 inches long, the orange band is 0.63 inches long, the purple band is 0.90 inches long, the red band is 1.48 inches long, and the yellow band is 1.85 inches long.

TABLE 4 cold-shrink tubing

| Band Color | C1 minimum | C1 maximum | Tubing size ID × length | Max tool weight |
|---|---|---|---|---|
| Blue | 0.39" | 0.63" | 1" × 2" | 1.5 lbs. |
| Green | 0.45" | 1.02" | 1.4" × 2.25" | 1.5 lbs. |

TABLE 4-continued cold-shrink tubing

| Band Color | C1 minimum | C1 maximum | Tubing size ID × length | Max tool weight |
|---|---|---|---|---|
| Orange | 0.55" | 1.18" | 1.6" × 2.5" | 3.0 lbs. |
| Purple | 0.75" | 1.65" | 2.1" × 2.75" | 4.0 lbs. |
| Red | 1.00" | 2.48" | 2.75" × 3" | 8.0 lbs. |
| Yellow | 1.65" | 3.50" | 4.1" × 3.5" | 10 lbs. |

Figure 13:
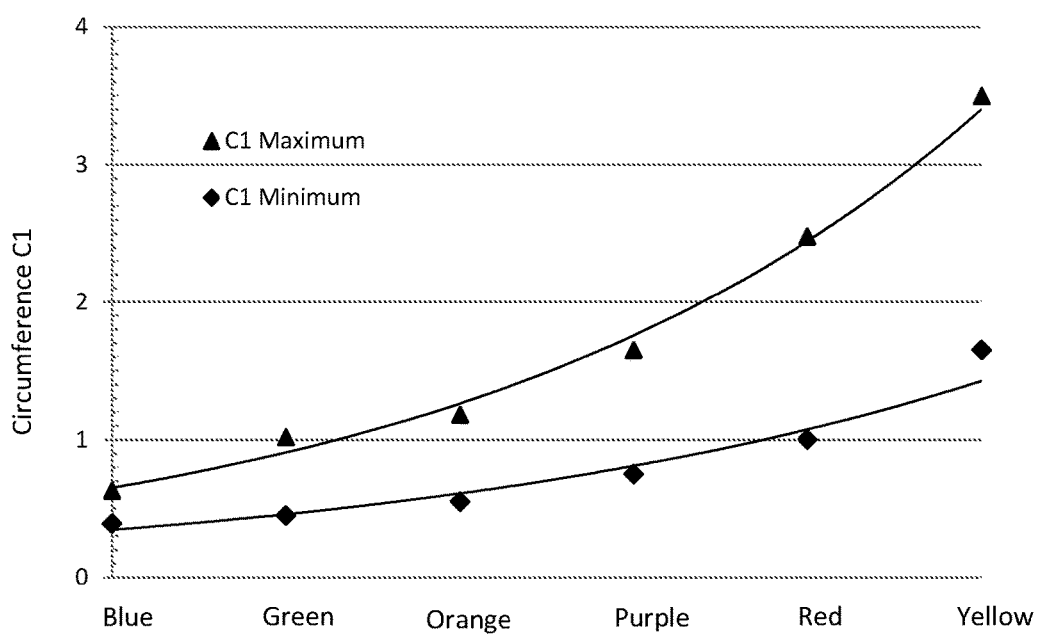
FIG. 13 is a graphical representation of the data in Table 4 showing the minimum and maximum circumferences for various sizes of shrink tubing in Table 4.

FIG. 13 is a graphical representation of the data in Table 4 showing the minimum and maximum circumferences for various sizes of shrink tubing identified by band colors in Table 4. For shrink tubing 20 identified by each band color, FIG. 13 plots the minimum and maximum values of first circumference C1 on the Y axis and the band color on the X axis. The vertical distance between the minimum and maximum values of C1 is the length of the band 108 on measurement guide 100. As shown in the graphical representation of FIG. 13, the minimum and maximum values of first circumference C1 also generally follow an exponential trend. Here, a trend line for the minimum circumference C1 has the equation $Y=0.0634X^2-0.2109X+0.575$ and has an $R^2$ value of 0.9829. A trend line for the maximum circumference C1 has the equation $Y=0.1041X^2-0.1802X+0.795$ and has an $R^2$ value of 0.9919. As above, for cold-shrink tubing corresponding to the particular embodiment, the exponential trend is likely a result of the tubing sizes available from manufacturers. Other tubing sizes are also acceptable, such as tubing having a linear trend or an increase of a fixed amount between each minimum or maximum circumference value.

Table 5 below provides an example of shrink tubing 20 and corresponding bands 108 for embodiments of measurement guide 100 for hand tool 5 with abrupt geometry, but with a measuring surface layout with bands arranged end-to-end as shown in FIG. 6. In this example, measurement guide 100 is adapted for heat-shrink tubing installed on a hand tool 5 having abrupt geometry and installed without use of tape 30. Tubing sizes listed in Table 5 are the sizes of heat-shrink tubing as supplied in the expanded state. For example in Table 5, the blue band is 0.29 inches long, the green band is 0.39 inches long, the orange band is 0.39 inches long, and the purple band is 0.59 inches long. The maximum tool weight is different when using a 12" tether versus a 48" tether.

TABLE 5 heat-shrink tubing

| Band Color | C1 minimum | C1 maximum | Tubing size ID × length | Max tool weight, 12" tether | Max tool weight, 48" tether |
|---|---|---|---|---|---|
| Blue | 0.36" | 0.65" | 1" × 1.75" | 4 lbs. | 2 lbs. |
| Green | 0.66" | 1.05" | 1.5 × 2.0" | 4 lbs. | 2 lbs. |
| Orange | 1.06" | 1.45" | 2.0" × 2.0" | 6 lbs. | 2.5 lbs. |
| Purple | 1.46" | 2.05" | 2.75" × 2.0" | 6 lbs. | 2.5 lbs. |

Figure 14:
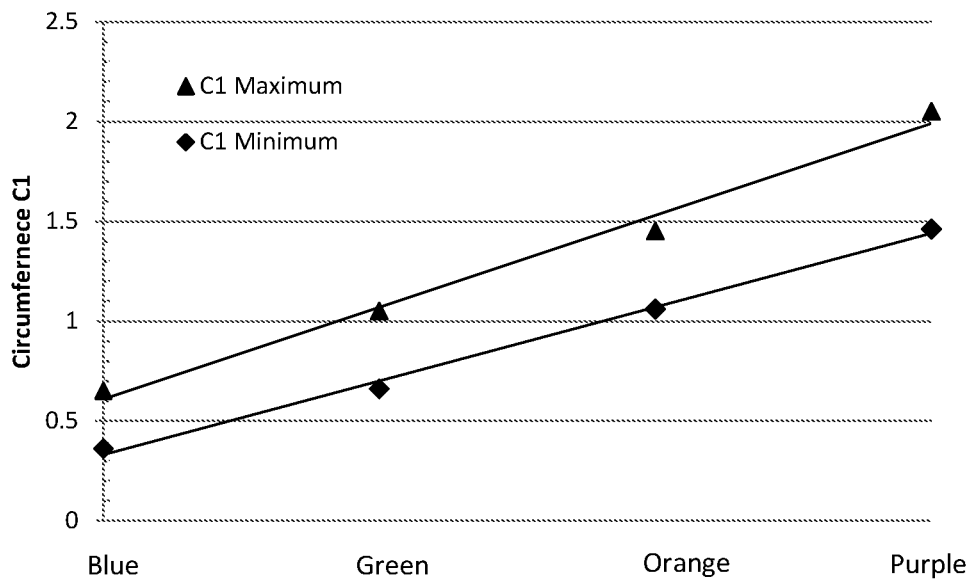
FIG. 14 is a graphical representation of the data in Table 5 showing the minimum and maximum circumferences for various sizes of shrink tubing in Table 5.

FIG. 14 is a graphical representation of the data in Table 5 showing the minimum and maximum circumferences for various sizes of heat-shrink tubing identified by band colors in Table 5. For shrink tubing 20 identified by each band color, FIG. 14 plots the minimum and maximum values of first circumference C1 on the Y axis and the band color on the X axis. The vertical distance between the minimum and maximum values of C1 is the length of the band 108 on measurement guide 100. As shown in the graphical representation of FIG. 14, the minimum and maximum values of first circumference C1 generally follow a linear trend. Here, a trend line for the minimum circumference C1 has the equation Y=0.37X−0.04 and has an $R^2$ value of 0.9956. A trend line for the maximum circumference C1 has the equation Y=0.46X+0.15 and has an $R^2$ value of 0.9888. Notably, by increasing the length of the orange or purple tubing to four inches, the maximum tool weight for a 48" tether increases to 4 lbs.

Table 6 below provides an example of shrink tubing 20 and corresponding bands 108 for embodiments of measurement guide 100 for hand tool 5 with abrupt geometry. Measurement guide 100 in this example has a measuring surface layout with staggered bands with overlapping ranges as shown in FIG. 7. In this example, measurement guide 100 is adapted for heat-shrink tubing installed on a hand tool 5 having abrupt geometry and installed without use of tape 30. Tubing sizes listed in Table 6 are the sizes of heat-shrink tubing as supplied in the expanded state. For example, in Table 6, the blue band is 0.29 inches long, the green band is 0.39 inches long, the orange band is 0.39 inches long, and the purple band is 0.59 inches long. The maximum tool weight is different when using a 12" tether versus a 48" tether.

TABLE 6 heat-shrink tubing

| Band Color | C1 minimum | C1 maximum | Tubing size ID × length | Max tool weight |
|---|---|---|---|---|
| Blue | 0.25" | 0.50" | .34" × 1.75" | 4 lbs. |
| Green | 0.36" | 0.75" | 1.0 × 1.75" | 5 lbs. |
| Orange | 0.55" | 1.25" | 1.5" × 2.0" | 10 lbs. |
| Purple | 0.75" | 1.75" | 2.0" × 2.0" | 15 lbs. |
| Red | 1.5" | 2.5" | 2.75" × 2.0" | 20 lbs. |
| Yellow | 2.25" | 3.5" | 4.0" × 4.0" | 25 lbs. |

Figure 15:
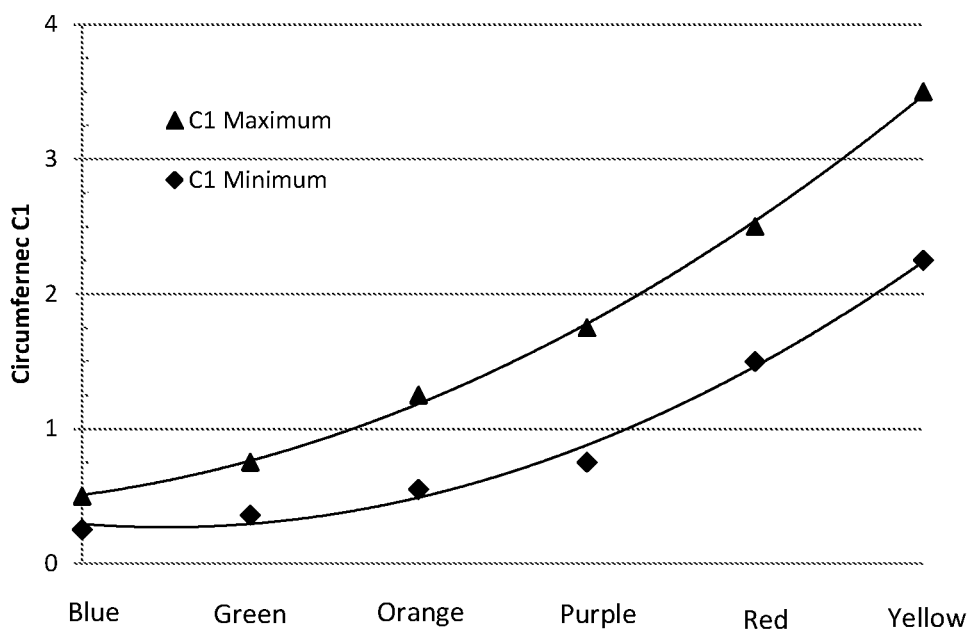
FIG. 15 is a graphical representation of the data in Table 6 showing the minimum and maximum circumferences for various sizes of shrink tubing in Table 6.

FIG. 15 is a graphical representation of the data in Table 6 showing the minimum and maximum circumferences for various sizes of heat-shrink tubing identified by band colors in Table 6. For shrink tubing 20 identified by each band color, FIG. 15 plots the minimum and maximum values of first circumference C1 on the Y axis and the band color on the X axis. The vertical distance between the minimum and maximum values of C1 is the length of the band 108 on measurement guide 100. As shown in the graphical representation of FIG. 15, the minimum and maximum values of first circumference C1 generally follow a second-order polynomial trend. Here, a trend line for the minimum circumference C1 has the equation $Y=0.0971X^2-0.2909X+0.488$ and has an $R^2$ value of 0.9908. A trend line for the maximum circumference C1 has the equation $Y=0.0848X^2-0.0009X+0.425$ and has an $R^2$ value of 0.9888. Notably, by increasing the length of the purple tubing to four inches, the maximum tool weight increases to 25 lbs. Similarly, by increasing the length of the red tubing to four inches, the maximum tool weight increases to 25 lbs.

Referring now to FIG. 16, an exemplary hand tool 5 is illustrated with measurement guide 100 for a hand tool 5 with a hand tool body or installation portion 6 and hand tool ends 8a, 8b with significant differences in geometry. Shown at the lower portion of FIG. 16, measurement guide 100 is wrapped around an open box end 8a of hand tool 5 with back side 101b facing up. Back side 101b as shown includes second ruler 113 with second scale 113a that is adjusted by the predefined value of ratio C2/C1 for the user to determine if open box end 8a is abrupt geometry 7 of sufficient size compared to installation portion 6. For example, second measurement scale 113a is 1.5 times the first measurement scale 112a, where a predefined cutoff value of 1.5 is used to relate first measurement scale 112a to second measurement scale 113a and represents the desired minimum ratio of C2/C1=1.5 for abrupt geometry 7. In this example, the scale numbers of second scale 113a are not actual measurement values relative to the circumference but are used to compare the number aligned with the measurement indicator 106 of the second scale 113a to the actual measurement value of the first 112a. Second strip end 104 has been passed through slot 114 and flexible strip 101 pulled taught against box end 8a. Measurement indicator 106 aligns with scale number 2.75, which is considered scaled second circumference C2'. As noted above, it is contemplated that first ruler 112 and/or second ruler 113 may be separate from measurement guide 100 or included as part of measurement guide 100.

Measuring surface 101a of measurement guide 100 is used to measure first circumference C1 of installation portion 6. Front side 101a of flexible strip 101 includes first ruler 112 with first measurement scale 112a and a plurality of bands 108 corresponding to shrink tubing 20 of predefined sizes. Second strip end 104 has been passed through slot 114 and flexible strip 101 pulled taught against installation portion 6. Measurement indicator 106 aligns with first ruler 112, indicating that first circumference C1 is about 2.45 inches on first scale 112a.

Since scaled second circumference C2' (2.75) is greater than first circumference C1 (2.45) using second scale 113a, the user determines that open box end 8a is abrupt geometry 7 without having to do any calculation of ratios of the circumferences because the use of second ruler 113 having second scale 113a with the predefined ratio of C2/C1 of 1.5 relative to first scale 112 inherently has the calculation built into second scale 113. Consequently, a user need only compare the measured number on second scale 113 to the measured number on first scale 112. If the second scale number is less than the first scale number, then the user selects the flexible strip 100 for geometries that are not considered abrupt. If the second scale number is equal to or greater than the first scale number, then the user selects the flexible strip 100 for geometries that are considered abrupt. Accordingly in the example shown in FIG. 16, the user has correctly selected measurement guide 100 to determine the appropriate shrink tubing 20, where measurement guide 100 is configured for hand tools 5 with abrupt geometry meeting the desired minimum predefined value. In this example, the predefined value is the ratio of C2/C1 of 1.5.

After measuring first circumference C1, the user also may note that measurement indicator 106 extends across band 108a and band 108b. Band 108a is visibly coded with color, a label, hatching, or other indicia to communicate a maximum tool weight of 1.2 lbs. Band 108b is visibly coded to communicate a maximum tool weight of 3.0 lbs. Knowing that hand tool 5 has a hand tool weight of 2.0 lbs., the user then selects shrink tubing 20 (shown in FIG. 3) with a size corresponding to band 108b. In some embodiments, shrink tubing 20 bears the same visible code (e.g., a blue color indicator) as the corresponding band 108 (e.g., blue strip) to enable the user to quickly and easily identify the correct shrink tubing 20 for hand tool 5.

Figure 17:
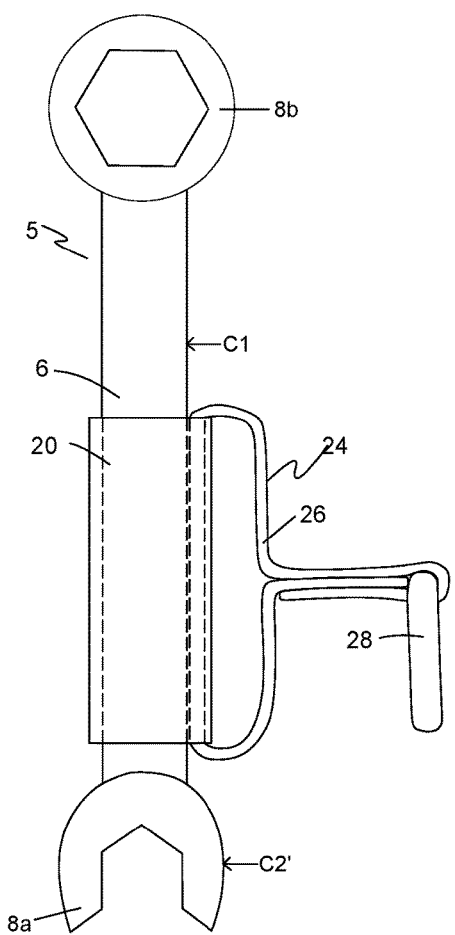
FIG. 17 illustrates an elevational view of the hand tool of FIG. 11 shown with shrink tubing and a tethering device installed in the installation portion of the hand tool.

Referring now to FIG. 17, hand tool 5 of FIG. 16 is shown with box end 8a, closed box end 8b, and installation portion 6. Shrink tubing 20 with tethering device 24 is installed on installation portion 6 after selecting shrink tubing 20 using measurement guide 100 for hand tools 5 with abrupt geometry 7. Tethering device 24 includes a length of webbing 26 that extends through shrink tubing 20 and defines a closed loop to secure a D-ring connector 28.

Figure 18:
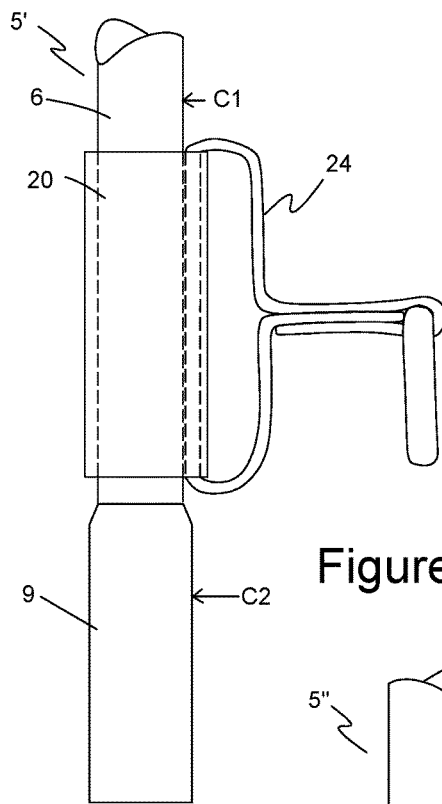
FIG. 18 illustrates an elevational view of a portion of another hand tool showing shrink tubing with tethering device installed on the handle of a tool lacking abrupt geometry.

Referring now to FIG. 18, hand tool 5' is shown without abrupt geometry 7 adjacent installation portion 6, such as the handle 9 of a ratchet wrench. Shrink tubing 20 with tethering device 24 is installed on installation portion 6 after selecting shrink tubing 20 using measurement guide 100 for hand tools 5 without abrupt geometry 7 (e.g., shown in FIG. 6.) Here, second circumference C2 of handle 9 is not larger than first circumference C1 of installation portion 6 by the predetermined value (e.g., 1.5× or 50%.)

Figure 19:
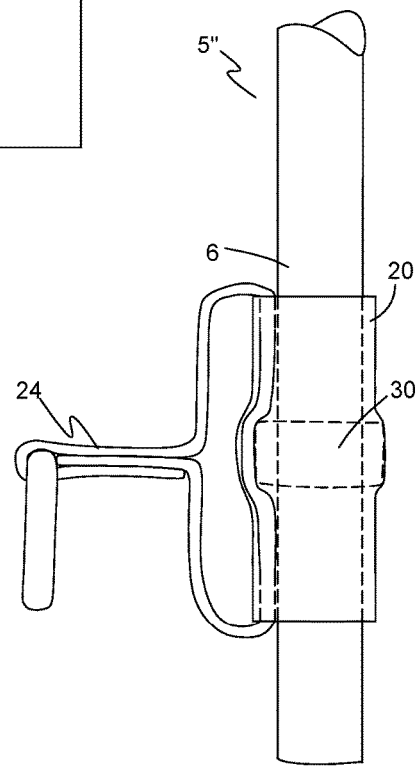
FIG. 19 illustrates an elevational view of a portion of another hand tool showing shrink tubing with tethering device installed over tape wrapped on the installation portion.

Referring now to FIG. 19, a portion of hand tool 5" is shown, where hand tool 5' lacks abrupt geometry 7 and, in fact, has no change in geometry. Tape 30 has been installed on installation portion 6 to create geometry. For example, tape 30 is self-amalgamating tape wrapped four times around installation portion 6 in overlapping wraps. Shrink tubing 20 with tethering device 24 is installed over tape 30 and installation portion 6 with tape 30 approximately centered along shrink tubing 20. When shrink tubing 20 is cold-shrink tubing, the use of tape 30 is optional. When shrink tubing 20 is heat-shrink tubing, the use of tape 30 is required to prevent the heat shrink tubing from sliding off of hand tool 5". One example of such a tool would be a centering pin where the only change in geometry is an end of the centering pin that tapers to a smaller diameter compared to the installation portion 6.

Figure 20:
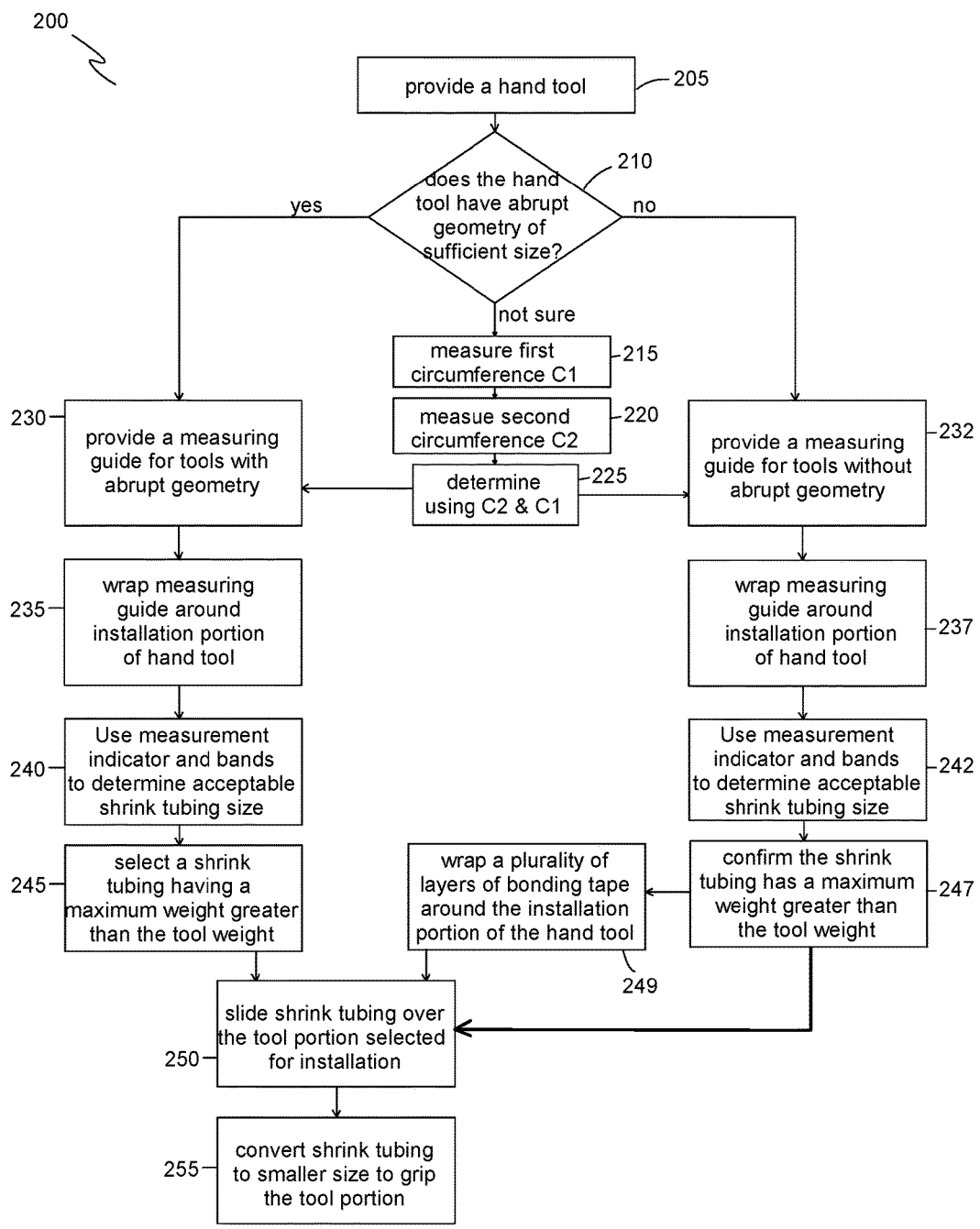
FIG. 20 is a flow chart illustrating steps in one embodiment of a method of selecting shrink tubing of the present invention.

Referring now to FIG. 20, a flowchart illustrates exemplary steps in one embodiment of a method 200 of selecting shrink tubing 20 for installation on a hand tool 5, where hand tool 5 has a hand tool weight and first circumference C1 for an installation portion 6 proposed for installation of shrink tubing 20. In step 205, hand tool 5 is provided with hand tool body or installation portion 6 for installation of shrink tubing 20.

Optionally in step 210, one determines whether hand tool 5 has abrupt geometry 7 with an increase in circumference C of at least a predetermined value compared to the installation portion 6 of hand tool 5 proposed for installation of shrink tubing 20. For example, the circumference from first circumference C1 to second circumference C2 increases by 50% for cold-shrink tubing or 15% for heat-shrink tubing. In one embodiment, step 210 includes determining whether each of two ends 8 of hand tool 5 have abrupt geometry 7. In some cases, hand tool 5 or one similar to it has previously been evaluated for abrupt geometry 7. In such a case, one may determine by visual inspection that it lacks abrupt geometry 7, that any geometry either lacks the desired minimum increase in circumference of the predetermined value (e.g., 50%) or that the increase from first circumference C1 to second circumference C2 is at least as great as the predefined value (e.g., 50% increase, 1.5 times C1, etc.) When this decision is made, for example, by visual inspection or when the answer is already known, the user then provides a measuring guide 100 as appropriate for the geometry of hand tool 5 as discussed below in more detail.

If the user is not sure whether hand tool 5 has abrupt geometry 7 with an increase from first circumference C1 to second circumference C2 of the minimum predefined value (e.g., at least 50%), the increase in circumference can be determined by measurement and calculation steps. In step 215, the user measures a first circumference C1 of installation portion 6 of hand tool 5 proposed for installation of shrink tubing 20. In step 220, the user measures a second circumference C2 of abrupt geometry 7 adjacent installation portion 6. An example of abrupt geometry is an open box wrench compared to the handle of the wrench. The closed box of the wrench is also an example of abrupt geometry 7. In step 225, first and second circumferences C1, C2 are used in a calculation or comparison with reference to a predefined cutoff value.

In one embodiment, step 225 is performed by calculating the ratio C2/C1 and comparing the ratio to a predefined cutoff value. If the ratio C2/C1 is greater than or equal to the predefined cutoff value, such as, for example, 1.5, then the user proceeds to step 230. If the ratio C2/C1 is less than the predefined cutoff value, then the user proceeds to step 232. For an open box wrench, the ratio C2/C1 is typically about 2.0. A ratio of 1.5 has found to be a useful cutoff value for cold-shrink tubing installed on hand tools 5 commonly used in the material-exclusion industries, such as box-end wrenches, ratchet wrenches, alignment bars, and the like.

As discussed above, other values for the ratio are also acceptable for cold-shrink tubing, including values from about 1.1 to about 1.7 such as 1.1, 1.2, 1.3, 1.4, 1.6, 1.7 and others. The C2/C1 ratio of 1.5 has also shown to be a useful cutoff value for cold-shrink tubing commonly available, such as EPDM rubber cold-shrink tubing made by 3M Corporation and sold as Cold Shrink Connector Insulators 8420 Series or equivalent. For heat-shrink tubing, the ratio C2/C1 equal to about 1.15 has been found experimentally to be a useful value. One example of heat-shrink tubing is heat shrinkable polymeric tubing made of polyethylene and olefin copolymers, sold as DUNBAR-CATV by Dunbar of Carrollton, Tex., and suitable for electrical insulation, EMI/RFI shielding, and cable jacketing. Of course, other values of the ratio C2/C1 for heat-shrink tubing are acceptable, such as values from about 1.05 to about 1.20. However, any other cutoff values may be used as appropriate for a particular group of tools or particular shrink tubing 20. Differences in tubing sizes, materials, shrink type, wall thickness, shrink ratio, and other properties of shrink tubing 20 as well as the types, sizes, geometry, materials, and other properties of hand tool 5 may dictate the best value for the ratio C2/C1 or other relationship between C2 and C1.

In another embodiment, the percentage of increase from C1 to C2 is calculated using the formula % increase=(C2−C1)/C1×100. The predetermined cutoff value is then expressed as a percent increase in circumference or size from C1 to C2. For example, if the percent increase is greater than or equal to 50%, then method 200 continues with step 230; else, method 200 continues with 232 for tools without abrupt geometry 7 meeting the minimum percentage increase.

In yet another embodiment, step 215 is performed using a first measurement scale to determine first circumference C1; step 220 is performed using a second measurement scale modified in relation to the first measurement scale by the predefined cutoff value to get a scaled or modified second circumference C2'. Thus, in step 225, if adjusted second circumference C2' is greater than or equal to first circumference C1, the method 200 continues with step 230. If adjusted second circumference C2' is less than first circumference C1, then method 200 continues with step 232. For example, first circumference C1 is determined using a ruler 112 on measurement guide 100 with a first scale 112a where one unit equals one inch (or one centimeter, if metric). Scaled/modified second circumference C2' is determined by measuring with a second ruler 113 with a second scale 113a where one unit equals 1.5 units of first scale 112a. Here, the predefined cutoff value is 1.5 in terms of the ratio C2/C1 or 50% in terms the percent increase from C1 to C2. Accordingly one unit on second scale 113a is 1.5× or 50% greater than one unit on first scale 112a.

Having determined in step 210, steps 210-225, or by other method that hand tool 5 has the desired abrupt geometry 7, method 200 continues with step 230 as shown on the left side of FIG. 20.

In step 230, measuring guide 100 is provided for hand tool 5 having abrupt geometry 7 as determined in steps 215 through 225, by other method, or as already known. For example, measuring guide 100 is an embodiment as described above with reference to FIG. 7.

In step 235, measuring guide 100 is wrapped around installation portion 6 of hand tool 5. Installation portion 6 is typically a non-working, longitudinal section of hand tool 5, such as a handle, neck, throat, or section between working ends 8 of hand tool 5. For example, installation portion 6 for a wrench with two box ends is the handle or longitudinal portion between the box ends.

In step 240, after wrapping measuring guide 100 snugly around installation portion 6, the user views the position of measurement indicator 106 with respect to one or more band 108. Measurement indicator 106 may align with one or more bands 108 to identify one or more corresponding shrink tubing 20 with a circumference range 110 appropriate for installation portion 6 of hand tool 5.

In step 245, the user compares the maximum weight for each acceptable shrink tubing 20 identified in step 240 and selects one or more shrink tubing 20 with a maximum weight capacity that is at least as great as the weight of hand tool 5. In some cases, zero, one, or more than one shrink tubing 20 will satisfy both the range 110 and maximum weight for hand tool 5. For cold-shrink tubing, where more than one shrink tubing 20 is determined to be acceptable, it is generally preferable to select shrink tubing 20 with a smaller range 110 since the gripping strength of cold-shrink tubing decreases as shrink tubing 20 is allowed to constrict toward its relaxed state.

In optional step 250, shrink tubing 20 selected in step 245 is installed on hand tool 5 by sliding over end 8 and positioning along installation portion 6. Abrupt geometry 7 often includes end 8 as noted above. For example, shrink tubing 20 is slid over a box end of a wrench and positioned along the longitudinal portion between ends 8 of the wrench. In some embodiments, step 250 includes selecting shrink tubing 20 with a web tail 10, length of webbing, or other tethering device 24 installed through shrink tubing 20. In other embodiments, step 250 includes inserting such a tethering device 24 through shrink tubing 20 either before or after positioning on installation portion 6 of hand tool 5. For cold-shrink tubing, tethering device 24 may be installed between the releasable core and the tubing during manufacture.

In step 255 shrink tubing 20 is converted to a smaller size, thereby allowing it to constrict against and grip installation portion 6 of hand tool 5. When shrink tubing 20 is cold-shrink tubing, the coiled support structure is unraveled from within shrink tubing, thereby allowing cold-shrink tubing 20 to collapse around installation portion 6 of hand tool 5. When shrink tubing 20 is heat-shrink tubing, shrink tubing 20 is heated to convert it to a smaller state.

Referring to the right side of FIG. 20, steps of method 200 are discussed for hand tools 5 lacking abrupt geometry 7 as determined in step 210 or steps 210-225. Examples of such tools include alignment bars, a ratchet wrench with a cylindrical handle, hammers, chisels, pipe wrenches, adjustable wrenches, pliers, cutters, and other hand tools 5.

In step 232, measuring guide 100 is provided for hand tool 5 without abrupt geometry as determined in steps 215 through 225, by other method, or as already known. For example, measuring guide 100 is as described above with reference to FIG. 6 or FIG. 8.

In step 237, measuring guide 100 is wrapped around installation portion 6 of hand tool 5 proposed for shrink tubing 20 installation. Installation portion 6 is typically a non-working, longitudinal section of hand tool 5, such as a handle 9, neck, throat, or section between working ends 8 of hand tool 5. For example, installation portion 6 of an alignment bar is a middle section of the alignment bar. Installation portion 6 of a pipe wrench may be a section of the handle.

In step 242, after wrapping measuring guide 100 around installation portion 6, the user views the position of measurement indicator 106 with respect to one or more band 108. Measurement indicator 106 may align with one band 108 to identify a corresponding shrink tubing 20 with size range 110 that includes first circumference C1 of installation portion 6 of hand tool 5.

In step 247, the user compares the maximum weight for shrink tubing 20 identified in step 242 and confirms that the maximum weight rating is at least as great as the weight of hand tool 5. In some cases, no shrink tubing 20 will satisfy both the range 110 and maximum weight for hand tool 5.

In step 249, which is optional for cold-shrink tubing and for heat-shrink tubing installed on hand tools 5 with abrupt geometry 7, tape 30 (shown in FIG. 17) is wrapped in a plurality of concentric, overlapping layers around a middle part of installation portion 6 of hand tool 5. For example, four layers of tape 30 are wrapped directly on top of each other in the middle of installation portion 6. More or fewer layers may be used, depending on the thickness of tape 30 and the tubing ID of shrink tubing 20. Four layers of tape 30 has been found experimentally to provide sufficient clearance within tubing ID for unraveling the removable core in cold-shrink tubing. In doing so, tape 30 adds abrupt geometry 7 to installation portion 6 with a second circumference C2. Additional wraps of tape 30 provide geometry of a larger size, but may require shrink tubing 20 with a larger tubing ID.

In one embodiment, tape 30 is self-amalgamating or self-fusing tape made of silicone rubber, EPDM, ethylene propylene rubber (EPR), amalgamating butyl rubber, or polyisobutylene (FIB) amalgamating tape. For example, tape 30 is MOL reinforced 1×36 0.045" molecular sealing tape made by Proto and sold as part no. MOL3645VO. Another example of self-amalgamating tape is a mil spec reinforced silicone rubber tape meeting MIL-I-22444 specification as available, for example, from AB Thermal Technologies. The mil spec reinforced silicone rubber tape has a sinusoidal reinforcement fiberglass substrate for added strength and a tape width of about one inch. Other embodiments of self-amalgamating silicone rubber tape are non-reinforced. Another example of self-amalgamating tape is made by Arlon Silicone Technologies of Baer, Del., who makes a fully cured fusible silicone rubber tape with a 25% sinusoidal fiberglass substrate, a width of one inch, a thickness of about $\frac{1}{32}$ inch, a tensile strength of 70 PSI, an elongation of 38%, a durometer of 50, an adhesion strength of 6 lb./inch, and meeting MIL-I-22444-C.

After completing step 249, steps 250 and 255 are optionally performed as discussed above. Here, step 250 includes positioning shrink tubing 20 over tape 30, where tape 30 is approximately centered lengthwise along shrink tubing 20.

When step 255 is performed, shrink tubing 20 constricts around installation portion 6 and tape 30 (shown in FIG. 17).

The present invention provides several advantages. Embodiments of measurement guide 100 and methods of selecting shrink tubing for installation on a hand tool advantageously simplify selecting the proper shrink tubing 20 for hand tool 5. Measurement guides 100 and methods 200 of the present invention are employed to reduce costs, reduce waste of tethering supplies, and improve safety by facilitating proper selection of shrink tubing 20 according to size, weight capacity, and the presence or lack of abrupt geometry 7.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A measurement guide to assist in selecting a shrink tubing for installation of a tether attaching structure on a hand tool, the measurement guide comprising:
    a flexible strip having an intermediate portion interconnecting a first strip end and a second strip end and having a measuring surface, the first strip end including an enlarged portion with a slot;
    a measurement indicator on the flexible strip and proximate the first strip end immediately next to the slot;
    a plurality of bands disposed on the measuring surface forming a tubing size indicator gauge, each of the plurality of bands having a band specific indicia different from any adjacent band of the plurality of bands wherein the band specific indicia associates a specific size of shrink tubing with one of the plurality of bands, each of the plurality of bands having a length wherein the lengths include different lengths;
    the tubing size indicator gauge selected from the group consisting of a first measuring surface layout wherein each band of the plurality of bands is aligned end to end along the measuring surface and wherein each band has a predefined length, which measuring surface layout is selected when a circumferential difference between a hand tool body and a hand tool end is less than a predefined absolute value, and a second measuring surface layout wherein each band of the plurality of bands is laterally spaced from each other, wherein each band has a predefined length and wherein at least one end of each band longitudinally extends beyond and overlaps with an adjacent band, each of the plurality of bands having a predefined length and being progressively staggered relative to each other along the measuring surface, which measuring surface layout is selected when a circumferential difference between a hand tool body and a hand tool end is greater than or equal to the predefined absolute value;
    wherein each band specific indicia identifies a specific shrink tubing size; and
    wherein the flexible strip is configured to be wrapped around a hand tool body of the hand tool and the slot is configured and arranged to slidably receive the second strip end and the intermediate portion with the measurement indicator aligning with at least one of the plurality of bands.

2. The measurement guide of claim 1, wherein the predefined absolute value is from 10% to about 60%.

3. The measurement guide of claim 1, wherein the predefined absolute value is from about 40% to about 50%.

4. The measurement guide of claim 1 further comprising a first ruler on the flexible strip, the first ruler having a first scale.

5. The measurement guide of claim 4 further comprising a second ruler on the flexible strip, the second ruler having a second scale that relates to the first scale by a predetermined ratio of the first circumference to the second circumference.

6. The measurement guide of claim 5, wherein the first ruler is on a first side of the flexible strip and the second ruler is on a second side of the flexible strip.

7. The measurement guide of claim 1, wherein the measurement indicator is adjacent a side of the slot proximate a distal end of the first strip end.

8. The measurement guide of claim 1, wherein the measurement indicator is adjacent a first side of the slot and the intermediate portion extends over a second side of the slot when wrapped around the hand tool body of the hand tool.

9. The measurement guide of claim 1, wherein the first strip end, the intermediate portion, and the second strip end are integral.

10. The measurement guide of claim 1, wherein the measurement indicator is positioned between the slot and a distal end of the first strip end.

11. A measurement guide to assist in selecting a shrink tubing for installation of a tether attaching structure on a hand tool, the measurement guide comprising:
    a flexible strip having an intermediate portion interconnecting a first strip end and a second strip end and having a measuring surface, the first strip end including an enlarged portion with a slot having a first side and a second side;
    a measurement indicator immediately next to the first side of the slot;
    a plurality of bands disposed on the measuring surface forming a tubing size indicator gauge, each of the plurality of bands having a band specific indicia different from any adjacent band of the plurality of bands wherein the band specific indicia associates a specific size of shrink tubing with one of the plurality of bands, each of the plurality of bands having a length wherein the lengths include different lengths;
    the tubing size indicator gauge selected from the group consisting of a first measuring surface layout wherein each band of the plurality of bands is aligned end to end along the measuring surface and wherein each band has a predefined length, which measuring surface layout is selected when a circumferential difference between a hand tool body and a hand tool end is less than a predefined absolute value, and a second measuring surface layout wherein each band of the plurality of bands is laterally spaced from each other, wherein each band has a predefined length and wherein at least one end of each band longitudinally extends beyond and overlaps with an adjacent band, each of the plurality of bands having a predefined length and being progressively staggered relative to each other along the measuring surface, which measuring surface layout is selected when a circumferential difference between a hand tool body and a hand tool end is greater than or equal to the predefined absolute value;
    wherein each band specific indicia identifies a specific shrink tubing size; and
    wherein the flexible strip is configured and arranged to be wrapped around a hand tool body of the hand tool and the slot is configured and arranged to slidably receive the second strip end and the intermediate portion, the measurement indicator is configured and arranged to align with at least one of the plurality of bands and the intermediate portion is configured and arranged to extend over the second side of the slot when the flexible strip is wrapped around the hand tool body of the hand tool.

12. The measurement guide of claim 11, wherein the predefined absolute value is from 10% to about 60%.

13. The measurement guide of claim 11, wherein the predefined absolute value is from about 40% to about 50%.

14. The measurement guide of claim 11 further comprising a first ruler on the flexible strip, the first ruler having a first scale.

15. The measurement guide of claim 14 further comprising a second ruler on the flexible strip, the second ruler having a second scale that relates to the first scale by a predetermined ratio of the first circumference to the second circumference.

16. The measurement guide of claim 15, wherein the first ruler is on a first side of the flexible strip and the second ruler is on a second side of the flexible strip.

17. The measurement guide of claim 11, wherein the first strip end, the intermediate portion, and the second strip end are integral.

18. The measurement guide of claim 11, wherein the measurement indicator is positioned between the slot and a distal end of the first strip end.

* * * * *